United States Patent [19]
Flint et al.

[11] Patent Number: 5,210,765
[45] Date of Patent: May 11, 1993

[54] LASER MICROSCOPY

[75] Inventors: Colin D. Flint, Essex; Simon Chenery, Leicestershire; Philip O'Grady, London, all of United Kingdom

[73] Assignee: Birkbeck College, London, United Kingdom

[21] Appl. No.: 857,065

[22] Filed: Mar. 25, 1992

[30] Foreign Application Priority Data

Mar. 25, 1991 [GB] United Kingdom ............... 9106337

[51] Int. Cl.⁵ .......................................... H01S 3/10
[52] U.S. Cl. ...................................... 372/23; 372/22
[58] Field of Search ................ 372/22, 23; 359/385, 359/661

[56] References Cited
U.S. PATENT DOCUMENTS 4,674,846  6/1987  Lippman .
4,933,944  6/1990  McGraw ............................. 372/22

FOREIGN PATENT DOCUMENTS 0327425  8/1989  European Pat. Off. .
1546513  5/1979  United Kingdom .

Primary Examiner—Akm E. Ullah
Assistant Examiner—Robert E. Wise
Attorney, Agent, or Firm—Flynn, Thiel, Boutell & Tanis

[57] ABSTRACT

A laser system generates a beam consisting of light of two wavelengths, one of which is in the visible spectrum. The light of the other wavelength is ultraviolet and is generated from the visible light as a harmonic of it. The ultraviolet light is focussed, by reflection only, onto a target. Most of the visible light is separated out of the beam by dichroic mirrors but a very small residue is allowed to illuminate the target so that the exact position at which the ultraviolet light impacts the target can be monitored by means of a microscope.

4 Claims, 1 Drawing Sheet

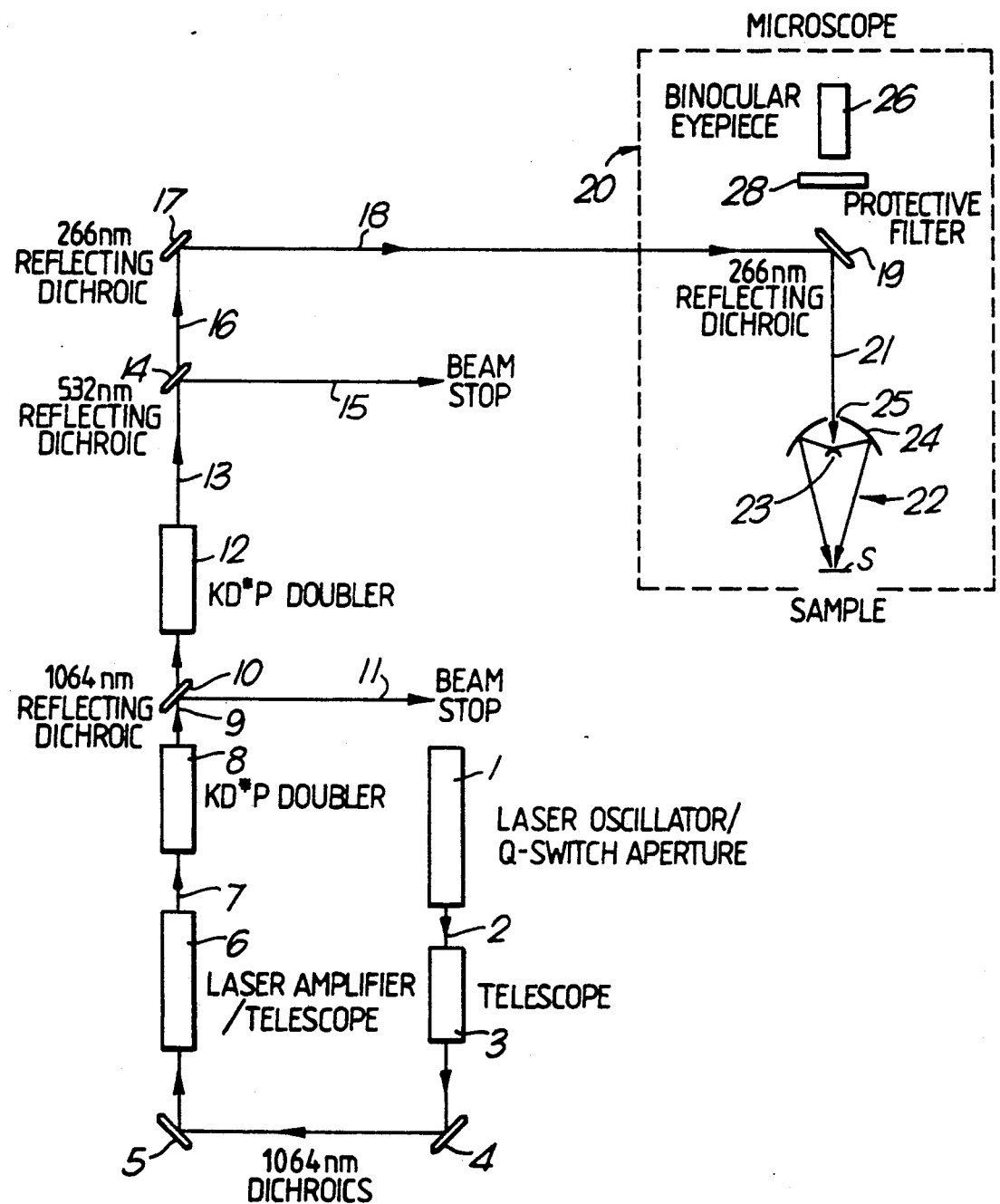

LASER MICROSCOPY

The present invention relates to laser microscopy in which laser-generated light in a non-visible part of the spectrum is focussed in a microscope onto a specimen under investigation. This may be, for example, for the purpose of ablating a small particle of material for mass-spectrometer analysis or for causing a small sample of material to fluoresce for spectral analysis as a result of radiation.

One such application of the invention is in the analysis of the elements present in small inclusions (typically in the range of 10–20 microns in size) embedded in a material such as quartz. The operator selects the inclusion to be analysed and then uses ultra-violet laser-generated light firstly to ablate the material above the inclusion itself, the material of which is then transferred in a stream of inert gas such as argon to the mass-spectrometer.

Since the ultra-violet light is invisible to the eye, it is difficult to obtain accurate registration of the focussed laser beam with the inclusion. It has previously been proposed to use a separate source of visible light to illuminate the target area but it has not been found possible to align this second source sufficiently accurately.

In accordance with the present invention, there is provided laser microscopy apparatus comprising a laser system for generating a laser beam comprising light of two wavelengths, the light of one wavelength being in the visible spectrum, the light of the other wavelength being outside the visible spectrum, the light of shorter wavelength being derived from the light of longer wavelength as a harmonic thereof, a first wavelength-dependant reflector in the beam path for separating almost all of the visible light from the non-visible light so as to produce two light beams extending in different directions, and a microscope having a reflective, non-refractive objective for forming an image of a specimen under investigation, an eyepiece for examining the image and a reflector in the microscope positioned to receive the beam of non-visible light and to divert it onto the objective for focussing by the latter on a specimen under investigation.

With such an arrangement, a small amount of visible light travels in the beam of non-visible radiation and is focussed onto the target with exactly the same precision as the non-visible light. This is made possible by the fact that there is no refraction of the light along its path from the laser to the target specimen.

Advantageously the reflector in the microscope is a further wavelength-dependant reflector positioned obliquely on the optical axis of the microscope between the objective and the eyepiece and constructed to transmit almost all of the visible light incident upon it both in the direction of the beam of non-visible light and in the direction of the optical axis of the microscope.

With this arrangement, the operator sees by means of the visible light the exact spot on the target which is being intensely illuminated by the non-visible light. Although the proportion of light reaching the user's eye after the transmission by the two wavelength-dependant reflectors in series is extremely small, it is found to be sufficient to be detected by the human eye.

Conveniently, the objective is of the kind which comprises a convex mirror facing the eyepiece and a concave mirror facing the convex mirror and having an aperture on the optical axis of the microscope.

The invention will now be further described by way of example with reference to the accompanying drawing in which the single figure shows diagramatically the major components of a laser microscopy apparatus according to the invention.

The apparatus shown in the drawing comprises a laser oscillator 1 of the Md:YAG type which is pumped by flash lamps in the normal manner to provide pulses of light of wavelength 1064 nm. In order to increase the intensity of the pulses, their duration is shortened in known manner by means of a Q switch, for example of the Pockels type. Further, an appropriate aperture is used to insure the TEM001 mode.

The pulsed beam 2 from the laser oscillator 1 is adjusted in size by means of a telescope 3 and the 1064 nm light is twice turned through 90° by means of appropriate dichroic mirrors 4 and 5 into a laser amplifier 6 again of the Nd:YAG type which is itself pumped by a further discharge lamp (not shown). The emerging beam 7 of high intensity pulses is then passed through a first frequency doubler 8 in which the high intensity of the pulses results in the generation, effectively by distortion, of green light of wavelength 532 nm.

The beam 9 emerging from the first frequency doubler 8 passes through an oblique dichroic mirror 10 which reflects the light of wavelength 1064 nm laterally along a path 11 towards a beam stop where it is absorbed. The pulses of wavelengths 532 nm continue into a second frequency doubler 12, thereby generating pulses of ultra-violet light of wavelength 266 nm. Both of the frequency doublers 8 and 12 may be of the potassium dihydrogen phthalate type.

The beam of light 13 leaving the second frequency doubler 12 contains light of wavelengths 532 nm and 266 nm. The beam 13 is passed through a further oblique dichroic mirror 14 which reflects almost all of the light of wavelength 532 nm along a path 15 to a beam stop where it is absorbed. In conventional apparatus, a refractive prism would be used in place of the mirror 14 as a result of which the beam 16 would contain no light of wavelength 532 nm. As a result of the use of a dichroic mirror, however, a small proportion of the light of wavelength 532 nm is transmitted in addition to the wavelength of light 266 nm. The beam 16 then strikes a further oblique dichroic mirror 17 which is arranged to reflect substantially all of the ultra-violet pulses of wavelength 266 nm as well as a small proportion of the residue of light of wavelength 532 nm. The resulting beam 18 is directed onto an oblique dichroic mirror 19 on the optical axis of a microscope 20. The mirror 19 directs the ultra-violet light downwards on path 21 together with a small proportion of the relatively small amount of green light of wavelength 532 nm in the beam 18.

The pulse beam 21 is directed down onto a reflecting objective 22 which consists of a small convex spherical mirror 23 on the optical axis facing upwards and a larger concave mirror 24 facing downwards and having a central aperture 25 on the optical axis of the microscope.

The objective 22 thus focusses, by reflection, the ultra-violet light of wavelength of 266 nm (as well as the green light of much lower intensity) onto a specimen S under investigation. The focussed green and ultraviolet light are inevitably coincident, since no refraction is involved.

The green light scattered by the specimen S travels back to the objective 22 in the normal manner and in leaving the objective 22 passes through the dichroic mirror 19 and an ultra-violet filter 25 to a binocular eyepiece 26 of the microscope through which the operator can accordingly determine with great precision the point on the sample S which is being eradiated by the ultra-violet light.

In the case of ablation microscopy, the sample S is mounted in an enclosure having a silica window to admit the laser light. A turbulent stream of inert gas such as argon is directed through the enclosure and thence to a mass spectrometer which may be of the inductively coupled plasma type.

We claim:

1. Laser microscopy apparatus comprising a laser system for generating a laser beam comprising light of two wavelengths, the light of one wavelength being in the visible spectrum, the light of the other wavelength being outside the visible spectrum, the light of shorter wavelength being derived from the light of longer wavelength as a harmonic thereof, a first wavelength-dependant reflector in the beam path for separating almost all of the visible light from the non-visible light so as to produce two light beams extending in different directions, and a microscope having a reflective, non-refractive objective for forming an image of a specimen under investigation, an eyepiece for examining the image and a reflector in the microscope positioned to receive the beam of non-visible light and to divert it onto the objective for focussing by the latter on a specimen under investigation.

2. Apparatus according to claim 1, wherein the reflector in the microscope is a further wavelength-dependant reflector positioned obliquely on the optical axis of the microscope between the objective and the eyepiece and constructed to transmit almost all of the visible light incident upon it both in the direction of the beam of non-visible light and in the direction of the optical axis of the microscope.

3. Apparatus according to claim 2, wherein the objective comprises a convex mirror facing the eyepiece and a concave mirror facing the convex mirror and having an aperture on the optical axis of the microscope.

4. Apparatus according to claim 1, wherein the objective comprises a convex mirror facing the eyepiece and a concave mirror facing the convex mirror and having an aperture on the optical axis of the microscope.

* * * * *